United States Patent [19]

Sonnenberg et al.

[11] Patent Number: 4,785,022

[45] Date of Patent: Nov. 15, 1988

[54] USE OF RUBBERY COPOLYMERS TO DECREASE COFFEE LEAKAGE IN FOAM CUPS

[75] Inventors: Fred M. Sonnenberg, Merion; Dennis M. Hajnik, West Chester, both of Pa.

[73] Assignee: Arco Chemical Company, Newtown Square, Pa.

[21] Appl. No.: 113,853

[22] Filed: Oct. 29, 1987

[51] Int. Cl.$^4$ .............................................. C08J 9/22
[52] U.S. Cl. ...................................... 521/57; 521/59; 521/139; 427/222; 428/36.5
[58] Field of Search ......................... 521/57; 427/222; 428/35

[56] References Cited

U.S. PATENT DOCUMENTS

| | | | |
|---|---|---|---|
| 3,098,056 | 7/1963 | Schnell et al. ........................ | 260/42 |
| 3,261,808 | 7/1966 | Schnell et al. ........................ | 260/47 |
| 4,269,871 | 5/1981 | Blommers et al. .................... | 521/57 |
| 4,307,134 | 12/1981 | Milkovich et al. ................... | 521/27 |
| 4,423,160 | 12/1983 | Di Guilio .............................. | 521/57 |
| 4,424,285 | 1/1984 | Di Guilio .............................. | 521/57 |
| 4,439,547 | 3/1984 | Di Guilio .............................. | 521/57 |
| 4,622,346 | 11/1986 | Di Guilio .............................. | 521/57 |

FOREIGN PATENT DOCUMENTS

| | | | |
|---|---|---|---|
| 3311517 | 10/1984 | Fed. Rep. of Germany ...... | 528/116 |
| 0202318 | 12/1982 | Japan .................................... | 528/370 |

*Primary Examiner*—Morton Foelak
*Attorney, Agent, or Firm*—Lewis J. Young

[57] ABSTRACT

Various rubber polymers and copolymers have been added as a coating to seed beads of vinyl aromatic polymers. Cups molded from these beads were coffee leak tested and generally exhibited enhanced retention of coffee.

4 Claims, No Drawings

USE OF RUBBERY COPOLYMERS TO DECREASE COFFEE LEAKAGE IN FOAM CUPS

BACKGROUND OF THE INVENTION

This invention relates to molded thermoplastic foam cups.

More specifically, this invention pertains to molded thermoplastic foam cups which exhibit enhanced coffee retention properties.

The manufacture of molded articles, e.g., cups from expanded thermoplastic particles is well known. The most commonly used thermoplastic particles are expandable polystyrene beads known as EPS. Typically, polystyrene beads are impregnated with a blowing agent which boils below the softening point of the polystyrene and causes the impregnated beads to expand when they are heated. When the impregnated beads are heated in a mold cavity, they expand to fill the cavity and fuse together to form a shaped article.

The formation of molded articles, e.g., cups from impregnated polystyrene beads, is generally done in two steps. First, the impregnated polystyrene beads are pre-expanded to a density of from about 2 to about 12 pounds per cubic foot. Second, the pre-expanded beads are heated in a closed mold to further expand the pre-expanded beads and to form a fused article having the shape of the mold. The second step is generally referred to as molding.

The pre-expansion step is conventionally carried out by heating the impregnated beads using any conventional heating medium such as steam, hot air, hot water, or radiant heat. One generally accepted method for accomplishing the pre-expansion of impregnated thermoplastic particles is taught in U.S. Pat. No. 3,023,175 to Rodman.

In the manufacture of foam cups, the preferred thermoplastic is expandable polystyrene beads. The polystyrene beads used to make foam cups are generally prepared by an aqueous suspension polymerization process which results in beads that can be screened to relatively precise bead sizes. Typically, bead diameters are within the range of from about 0.008 to about 0.02 inch.

In spite of careful bead size control, one problem which continues to plague the molded cup industry is that cups molded from expandable polystyrene beads exhibit a tendency to leak coffee. The leakage results from penetration of the coffee around the fused polystyrene beads. The present invention provides a molded foam cup which exhibits enhanced coffee retention.

SUMMARY OF THE INVENTION

It has now been found that if at least a portion of the surface of the thermoplastic beads is coated with a rubbery copolymer, cups molded therefrom exhibit enhanced coffee retention as compared to cups molded from the same expanded thermoplastic beads in the absence of the copolymer coating.

DETAILED DESCRIPTION OF THE INVENTION

In the practice of this invention, any suitable thermoplastic homopolymer or copolymer can be employed. Particularly suitable for use are homopolymers derived from vinyl aromatic monomers including styrene, isopropylstyrene, alphamethylstyrene, nuclear methylstyrenes, chlorostyrene, tertbutylstyrene, and the like, as well as copolymers prepared by the copolymerization of at least one vinyl aromatic monomer with monomers such as butadiene, alkyl methacrylates, alkyl acrylates, acrylonitrile, and maleic anhydride, wherein the vinyl aromatic monomer is present in at least 50% by weight of the copolymer. The preferred vinyl aromatic monomer is styrene.

The polymer useful in this invention must be in the form of beads, granules, or other particles convenient for the expansion and molding operations. Beads formed from an aqueous suspension process are essentially spherical and are preferred for molding foam cups.

The polymer particles are impregnated using any conventional method with a suitable blowing agent. For example, the impregnation can be achieved by adding the blowing agent to the aqueous suspension during the polymerization of the monomers, or alternatively by re-suspending the polymer particles in an aqueous medium and then incorporating the blowing agent as taught in U.S. Pat. No. 2,983,692 to D'Alelio. Any gaseous material or material which will produce a gas on heating can be used as the blowing agent. Conventional blowing agents include aliphatic hydrocarbons containing 4 to 6 carbon atoms in the molecule, such as butanes, pentanes, hexanes, and the halogenated hydrocarbons which boil at a temperature below the softening point of the polymer chosen. Mixtures of these blowing agents can also be used.

The rubber useful in the present invention are selected from the group consisting of polybutene, polyisobutylene, and polyisobutylene-butene copolymers. The copolymers are available commercially from Amoco Chemicals under the tradename Indopol polymers. These polymers are low molecular weight liquids readily soluble in styrene and are available in various molecular weights ranging from 420 to 2300. The Indopol polymers are made by polymerizing an isobutylene-rich butene stream with a metal halide catalyst. Also available commercially are various copolymers of butenes and ethylene sold by Shell Chemical Co. under the tradename DURAFLEX.

The copolymers are coated onto the polymer particles by the emulsion technique described in U.S. Pat. No. 4,622,346 to Di Giulio, which is incorporated hereby in its entirety. The technique comprises forming an aqueous suspension of initial styrene polymer beads and adding thereto an emulsion of a comonomer solution of vinyl aromatic monomer, divinylbenzene (if used), the isobutylene-butene rubber, and free-radical producing catalysts, and the suspension is heated to copolymerize the vinyl aromatic monomer and other additives onto and within the initial beads to form modified beads. The amount of rubber effective for the coatings is between 0.05 and 0.75 weight percent based on total beads plus styrene monomer. The coatings may be applied at concentrations between 1 and 35% by weight based on total beads.

The suitable emulsifiers to form the emulsion of vinyl aromatic monomer, divinylbenzene, the isobutylene-butene copolymer, and catalysts may be the sodium alkylbenzene sulfonates, such as dodecylbenzene sulfonate, as well as the various nonionic surfactants comprising polyoxyethylene monoethers and mono-esters, such as polyoxyethylene sorbitan monolaurate, wherein the polyoxyethylene portion may have from 20 to 50 moles of ethylene oxide. Examples of the mono-ethers are the ethylene oxide condensates of octyl or nonylphenol.

The catalysts are a mixture of at least two free-radical type materials comprising a primary low-temperature initiator having a 10-hour half-life temperature of between 60 and 80° C. and a secondary high-temperature initiator having a 10-hour half-life of between 95° and 110° C. Thus, a mixture of benzoyl peroxide and t-butyl perbenzoate which have 10-hour half-life temperature of 73 and 105° C., respectively, can be used. Azo catalysts having suitable 10-hour half-life temperatures are also useful.

EXAMPLE I

A series of runs were carried out as follows:

An initial polystyrene bead slurry was prepared in a 2-liter resin kettle having an agitator, reflux condenser, combination baffle/thermometer wells and a monomer feed port, by adding thereto 400 g of distilled water 12 g of tricalcium phosphate and 440 g of polystyrene beads of through 35 mesh and on 60 mesh bead size (U.S. Standard Sieve). The slurry was heated, with stirring at 400 rpm, to 70° C. and maintained at that temperature.

A comonomer solution was formed by mixing 120 g of styrene, 0.4467 g of 80.6% active divinylbenzene, 0.420 g of benzoyl peroxide, 0.0792 g of tert-butyl perbenzoate, and 2.8 g of a 2300 molecular weight isobutylene/butene copolymer (Indopol H1900 from Amoco Chemicals).

An emulsion was prepared by the addition of the comonomer solution to a solution of 12 ml of a 1% solution of sodium dodecylbenzene sulfonate in 148 g of distilled water. The mixture was mixed for 30 seconds using a Polytron high intensity stirrer.

The emulsion was added over a 30 minute period to the stirred 2-liter resin flask being maintained at 70° C. The suspension was heated to 90° C. and kept at that temperature for 90 minutes.

The suspension was cooled to 35° C. and transferred in 200 g portions to 12 oz bottles. The bottles were purged with nitrogen, sealed with crown caps and rotated end-over-end in an oil bath heated to 135° C. over 2 hours. The bottles were cooled to 35° C. and then opened. The beads were centrifuged and tray dried.

To render the beads from the above runs expandable, aliquots thereof were impregnated with n-pentane in 12 oz bottles heated at 105° C. for 2 hours while being rotated end-over-end in an oil bath according to the following formulations:
100 g of polystyrene beads
97 g of water
2 g of tricalcium phosphate
2 ml of 1% sodium dodecylbenzene sulfonate
1.5 g of a 10% aqueous solution of polyoxyethylene(20-)sorbitan monolaurate
0.23 g of a polyethylene wax
7.8 g of n-pentane The bottles were heated to 105° C. and after 2 hours, were cooled down to room temperature. The bottles were opened and the contents acidified to a pH of 1 by adding 2 ml of concentrated HCl and allowing the contents to sit for 15 minutes. The impregnated beads were washed, centrifuged and tray dried for 4 hours at room temperature. The beads were refrigerated overnight. The next day the beads were dry blended with 300 ppm of silicone oil and 800 ppm of zinc stearate and pre-expanded to a density of about 3-6 pcf.

Cup molding was carried out using a 6W smooth wall mold which produces a 6 oz cup. The Thompson cup molding machine was set to a steam header pressure of 120 psi and a back pressure of 35 psi. The total molding cycle took 6.45 seconds per cup and consisted of fill time 0.85 second, dwell time 0.65 second, cook time 1.70 seconds, and cool time 3.25 seconds. Forty cups were molded from each run and allowed to age overnight before testing.

Ten cups of each run were subjected to coffee retention testing as follows: Coffee at 190° F. was poured into each cup and the side walls and bottom of each cup containing coffee was observed for coffee stains or leakage every 15 minutes over a two hour period.

The mean time to failure (MTF) of each ten cup sample was calculated by adding the time to failure for each cup (the 15 minute period during which a cup exhibits leakage or staining is recorded as the time to failure for that cup) and dividing the total time by the number of cups tested. The maximum MTF value if none of the ten cups in a run exhibited any stain or leakage is 2.0 hours. The minimum MFT value if all ten cups fail within the first 15 minutes is 0.25 hour.

Coffee retention testing was repeated on a second set and a third set of ten cups of each of the runs 2 weeks and 1 month after the first test. The results of the coffee retention testing are shown in Table I. The additive level is the weight-% of Indopol H1900 per total weight of beads and styrene.

TABLE I

| Additive Level | 1 Day Age MTF | 2 Week Age MTF | 1 Month Age MTF |
| --- | --- | --- | --- |
| 0.50$^a$ | 1.95 | 1.68 | 0.80 |
| Control | 1.53 | 0.75 | 0.75 |
| 0.50$^a$ | 1.70 | 1.00 | 1.85 |
| Control | 1.20 | 0.75 | 0.25 |
| 0.75$^a$ | 2.00 | 2.00 | 1.43 |
| 0.25$^a$ | 2.00 | 1.55 | 1.95 |
| 0.10$^a$ | 2.00 | 2.00 | 2.00 |
| Control | 2.00 | 1.55 | 1.95 |
| 0.10$^b$ | 2.00 | 1.20 | 1.60 |
| 0.10$^c$ | 2.00 | 0.88 | 1.20 |
| Control | 2.00 | 0.90 | 1.00 |

$^a$21.4% coating
$^b$5% coating
$^c$10% coating

We claim:

1. A method for enhancing the coffee retention of molded foam cups made from vinyl aromatic polymer particles which have been impregnated with a blowing agent which method comprises coating the vinyl aromatic polymer particles with a effective amount of a rubber selected from the group consisting of polybutene, polyisobutylene, isobutylene-butene copolymer and butene-ethylene copolymer.

2. The method of claim 1 wherein said effective amount of rubber is between about 0.05 and 0.75 weight percent based on total beads plus styrene monomer.

3. The method of claim 1 wherein said vinyl aromatic polymer particles are polystyrene beads.

4. The method of claim 1 wherein said coating comprises from 1 to 35 percent by weight based on total beads.

* * * * *